March 18, 1969  K. VÖGTLIN  3,434,152
TACHOGRAPHS FOR AUTOMOBILES
Filed Jan. 10, 1967  Sheet 1 of 2
FIG.1
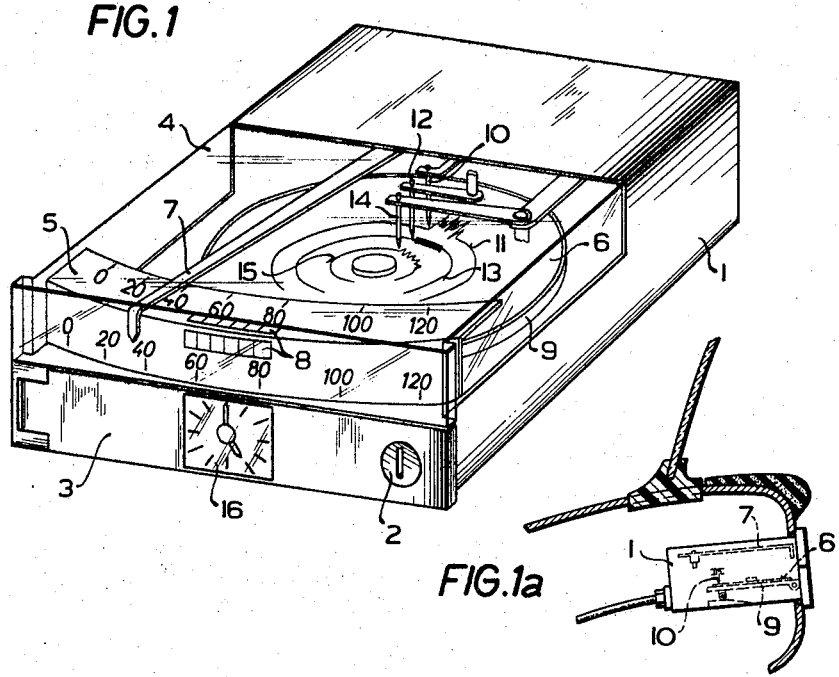
FIG.1a
FIG.2
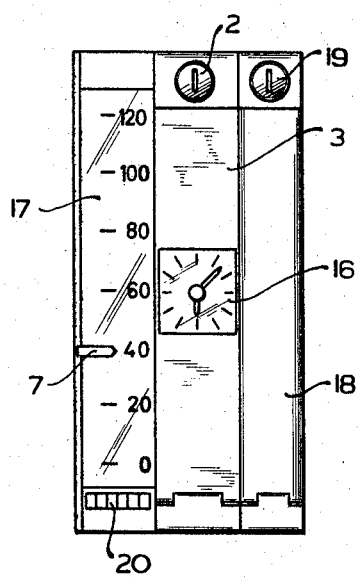
INVENTOR
Karl Vögtlin
by Michael S. Striker March 18, 1969  K. VÖGTLIN  3,434,152

TACHOGRAPHS FOR AUTOMOBILES

Filed Jan. 10, 1967

INVENTOR
Karl Vögtlin

United States Patent Office 3,434,152
Patented Mar. 18, 1969

3,434,152
TACHOGRAPHS FOR AUTOMOBILES
Karl Vögtlin, Villingen, Black Forest, Germany, assignor to Kienzle Apparate G.m.b.H. Villingen, Black Forest, Germany
Filed Jan. 10, 1967, Ser. No. 608,396
Claims priority, application Germany, Jan. 13, 1966, K 58,129
U.S. Cl. 346—18        15 Claims
Int. Cl. G01d 9/38, 15/26, 15/34

ABSTRACT OF THE DISCLOSURE

A tachograph housing is mounted on the dashboard of an automobile in a position in which the diagram sheet is located in a plane perpendicular to the dashboard, and has a door or drawer supporting the clock driven carrier of the diagram sheet so that the carrier can be pulled out of the housing for exchange of the diagram sheet. At the beginning of the movement of the diagram sheet out of the housing, it is moved out of engagement with the recording means to prevent undesired recordings.

Background of the invention

The present invention relates to tachographs which are used for recording the operations of a vehicle on which it is mounted. In some countries, police regulations require use of tachographs for all trucks and buses. The speed of the vehicle, the time period during which the vehicle is operated, and the distances traveled are recorded, in some cases together with the number of revolutions of the engine.

There has been a demand for tachographs for passenger cars, but the known tachographs which are constructed for trucks and buses, are not suitable for the smaller passenger cars, particularly since they are constructed to have the diagram sheet supported parallel to the installation plane, and are of such a size that they cannot be built into the dashboard, but have to be arranged below the same in passenger cars, where they obstruct the operation and use of the car.

A tachograph has been proposed for use in passenger cars which are already equipped with a speedometer and a clock. This tachograph has a completely closed casing with rectangular walls permitting mounting on the dashboard, for example, instead of a radio, or even below the dashboard without taking up too much space. This known tachograph has a slot for the insertion and removal of the diagram sheets.

An important disadvantage of the known tachograph is that it cannot be used in all cars, but only with a separate tachometer and clock in a passenger car. The user of conventional tachographs which are opened for the exchange of diagram sheets, are required to get used to the different manner of inserting the diagram sheets.

The U.S. Patent 2,341,118 discloses a tachograph which has in front a circular indicator dial, and which has on one side a drawer in which a band shaped record carrier is mounted so that the same can be pulled out. This tachograph has the advantage that a special coupling device between the speedometer and the indicator is not required, while on the other hand, a section of the record carrier tape is visible behind a window on the front wall of the device. A disadvantage is the circular indicating dial, and also the laterally arranged drawer which prevents the mounting of the tachograph behind the dashboard.

Summary of the invention

It is one object of the invention to provide a tachograph of compact construction which can be built into the dashboard of a passenger car.

Another object of the invention is to provide a tachograph permitting the exchange of diagram sheets by operation of a movable housing part, such as a door or drawer.

Another object of the invention is to provide a tachograph permitting a change of the diagram sheets in a manner which does not require any skill, or retraining of users of conventional tachographs.

It is also an object of the invention to provide a tachograph which permits observation of the recordings on the diagram sheet during the operation of the automobile.

With these objects in view, the present invention relates to a tachograph which has a stationary speedometer dial, and a carrier for a diagram sheet which is mounted on a drawer or door and can be pulled out with the same when the tachograph is mounted on the dashboard in an installation plane which is intersected by the recording plane in which the diagram sheet is located.

It is preferred that the surface on which a diagram sheet is supported in the recording plane, extends perpendicularly to the plane in which the door or front wall of the drawer is located, and that the carrier of the diagram sheet is pivotally mounted on the door or front wall of the drawer.

One embodiment of the invention comprises housing means mounted behind the dashboard and including a stationary housing part, and a movable housing part mounted for movement between an inner position and an outer position located at least partly forwardly of the dashboard; recording means mounted on the stationary housing part and adapted to be driven by a movable part of the automobile; carrier means mounted on the movable housing part and having a supporting surface located in the inner position of said movable housing part in a plane intersecting the plane of the dashboard, the surface being adapted for supporting a diagram sheet engaged in said inner position by said recording means, and being located in said outer position outside of the stationary housing part and forwardly of the dashboard so as to be accessible for exchange of the diagram sheet.

In the preferred embodiment of the invention, a carrier means is mounted on the movable housing part, such as a door of the housing, or the front wall of a drawer for movement between a recording position in which the diagram sheet is engaged by the recording means, and an inoperative position in which the diagram sheet is spaced from the recording means.

Control guide means, such as cam means and cam follower means, operatively connect the carrier means with a stationary housing part so that during movement of the movable housing part with a carrier means between the inner and outer positions, the carrier means is moved between the recording position and the inoperative position.

In another embodiment of the invention, the door or drawer is locked by a lock, and the lock is connected with a carrier means to place the same in an inoperative position spaced from the recording means when the lock is operated to open the door, or unlock the drawer.

It is particularly advantageous to move the carrier with a diagram sheet to the inoperative position shortly after the movable housing part has started its movement from the inner position to the outer position, since in this manner, a short line is recorded indicating the access to the diagram sheet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

FIG. 1 is a perspective view illustrating a tachograph according to one embodiment of the invention;

FIG. 1a is a sectional view illustrating one position of the tachograph mounted on a dashboard;

FIG. 2 is a front view illustrating another embodiment of the invention;

Description of the preferred embodiments

Figure 3:
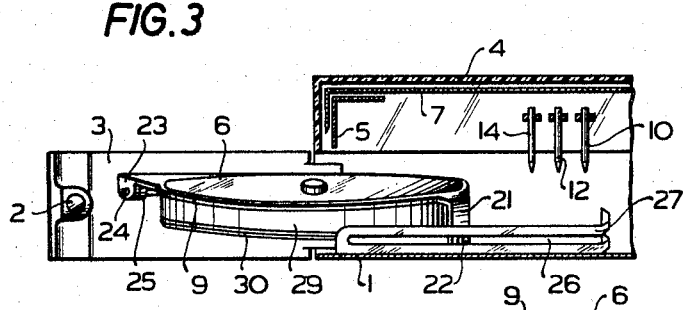
FIG. 3 is a fragmentary sectional view illustrating the tachograph of FIG. 1 in open condition.
Figure 4:
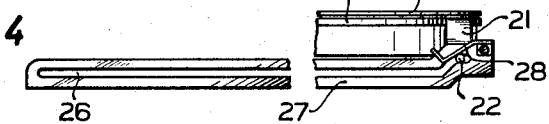
FIG. 4 is a fragmentary developed view illustrating cam means used in the embodiment of FIGS. 1 and 3.

The housing 1 of the tachograph shown in FIGS. 1, 3 and 4, includes a stationary housing part which has a rectangular front opening closed by a door 3 which can be locked by a lock 2 and carries a clock with a dial and pointer 16 located on the front face of door 3. The top of the housing is cut out, and closed by a transparent cover 4 having two side walls, a front wall, and a top wall permitting a view at the interior of housing 1. A speedometer dial 5 has a front scale located behind the transparent front wall, and another scale located under the transparent top wall so that the positions of a speedometer pointer 7 can be observed. Pointer 7 is operated in the usual manner by an eddy current drive connecting with an output gear of the gear transmission, not shown. The two scale portions of dial 5 have windows 8 behind which the indications of an odometer, not shown, appear in the usual manner.

A diagram sheet 6 rests on a supporting surface of a rotary part of a carrier 9 which has a projecting hinge bracket 23 connected by a pin 24 to a corresponding hinge bracket 25 which is secured to the door 3 so that carrier 9 is mounted on door 3 for angular movement between a lower position, and a higher recording position in which the diagram sheet 6 engages the points of three recording means 10, 12 and 14. Recording means 10 moves between positions representing the speed, and is driven from a movable part of the automobile to record a graph representing the speed when the rotary part of carrier 9 is rotated with a diagram sheet 6 by a clockwork in a casing 29. Recording means 12 is operated by a vibratory mass to make closely spaced zig-zag lines during movement of the automobile which can be distinguished from the circular line produced when the automobile is at a standstill. Recording means 14 makes recordings indicating the traveled distance. The operation of the recording means is well known and not an object of the present invention.

Carrier 9 has a bracket 21 with a cam follower pin 22 located in a cam slot 26 of a cam 27 which is mounted on the stationary part of the housing. When door 3 is opened, carrier 9 and casing 29 with diagram sheet 6 move with the door, while pin 22 moves about a circular path in cam slot 26 of cam 27 which has a corresponding circular curvature. Slot 26 has an end portion which is located higher than the main portion of slot 26, so that in the closed inner position of door 3, in which pin 22 is located in the higher cam slot portion, as shown in FIG. 4, carrier 9 and diagram sheet 6 are raised to a recording position in which recording means 10, 12 and 14 engage the diagram sheet 6. When door 3 is moved toward its outer open position, pin 22 moves down a slanted portion of cam slot 26, and carrier 9 turns about pin 24 to a lower inoperative position in which the diagram sheet 6 is located spaced from the points of the recording means 10, 12 and 14. Consequently, a short line is recorded by the recording means only during the movement of cam follower pin in the higher short slot portion, and such short lines indicate that the door has been opened. During the normal recording operations, a spring 28 acts on pin 22 to retain pin 22 at the end of the slot so that the recording position of carrier 9 and diagram sheet 6 can not be influenced by vibrations or jolts of the motor car.

When the door 3 is moved to the outer open position, the greater part of the carrier 9 and diagram sheet 6 are located outside of the stationary housing part, so that the diagram sheet can be easily exchanged. The circular casing 29, which has a slightly greater diameter than the diagram sheet 6, has preferably a semicircular slot 30 providing access to an inner compartment in which spare diagram sheets can be kept.

In the embodiment of FIG. 2, the speedometer dial 17 is arranged in a vertical position and has cut-outs 20 for observation of the indications of an odometer. Adjacent the narrow dial area, door 3 is mounted for turning movement about a hinge at its lower end and has a lock 2 and the dial 16 of a clock. A carrier 9, not shown, for a diagram sheet is mounted on door 3 in the embodiment of FIG. 2, as described with reference to FIGS. 1 and 3.

The housing of the embodiment of FIG. 2 has a compartment for spare diagram sheets which is closed by another door 18 locked by a lock 19. The provision of compartments for storing spare diagram sheets is a great advantage as compared with known arrangements in which the diagram sheets have to be kept in a separate box which has to be placed somewhere in the motor car.

Figure 5:
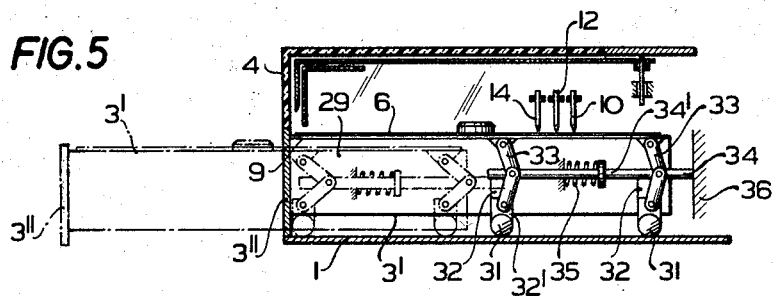
FIG. 5 is a fragmentary schematic sectional view illustrating a modified embodiment of the invention.

In the embodiment of FIG. 5, the movable housing part is not a hinged door, but a drawer 3' having a front wall 3" which in the inner position of the door is positioned below the transparent front wall of cover 4 in the same position as door 3 in FIG. 1. Expansible mounting means 33 are provided in the form of toggle levers which are respectively connected with carrier 9 and with slides 32' guided in vertical guide slots 32. A rod 34 is articulated to the pivot joints of the toggle levers and carries a flange 34' engaged by a spring 35 which abuts the movable housing part 3' so that the toggle levers are biased to assume the position shown in broken lines in which they are contracted so that carrier 9 and a diagram sheet 6 thereon are located below a plane of the points of the recording means 10, 12 and 14.

When the drawer 3' is moved from the outer position shown in broken lines to the inner position shown in solid lines, rod 34 engages and abuts a wall portion 36 of the stationary housing part and is longitudinally shifted so that the toggle levers expand and raise carrier 9 with diagram sheet 6 since the rollers 31 turnably carried by sildes 32' are pressed downward against the bottom of a stationary housing part. Consequently, in the inner position of the movable housing part 3', 3", the diagram sheet is in engagement with the recording means, while the diagram sheet is separated from the recording means when the drawer 3', 3" is pulled out to the outer position in which carrier 9 and the diagram sheet 6 thereon are accessible for exchange and inspection. If the carrier would not be lowered during such movement, recording means 10, 12 and 14 would all make lines to the edge of the diagram sheet during the outward movement of drawer 3', 3". A clock is mounted on the front wall 3" as described for the movable housing part 3 in FIG. 1, and the front wall 2" is advantageously provided with a lock.

Figure 6:
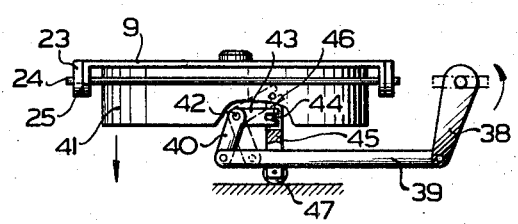
FIG. 6 is a fragmentary schematic, partly sectional view, illustrating another embodiment of the invention.
Figure 7:
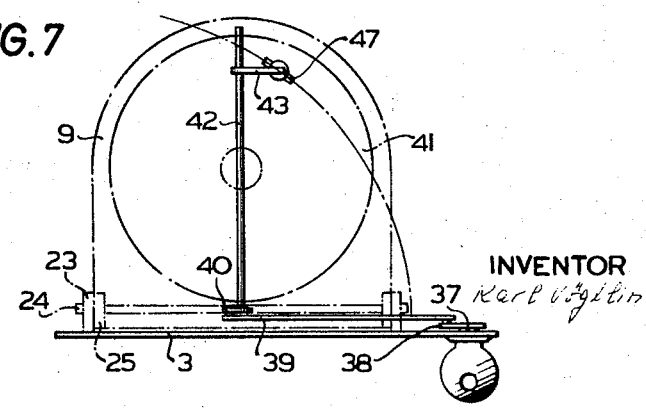
FIG. 7 is a fragmentary schematic plan view of the embodiment of FIG. 6.

The embodiment of FIGS. 6 and 7 is similar to the embodiment described with reference to FIGS. 1 and 3, and carrier 9 is mounted by means of hinges 23, 25 and a hinge pin 24 on the door 3, as described with reference to FIG. 3, so that the diagram sheet can be raised to a recording position engaging the recording means 10, 12 and 14, and an inoperative position permitting opening of the door 3 for the exchange of the diagram sheet without producing a recording in the direction of movement of the carrier and diagram sheet.

Instead of raising and lowering the diagram sheet and carrier 9 by cam means, the embodiment of FIGS. 6 and 7 accomplishes the lowering of diagram sheet to the inoperative position before the door 3 of the movable housing part is opened, and under the control of the lock 2 by which door 3 is locked, as described with reference to FIGS. 1 and 3.

The turnable part 37 of lock 2, which is operated by a key, carries a fixed lever 38 connected by link 39 to a lever arm 40, secured to a shaft 42 which extends from the door 3 toward the rear of the housing, and carries a fixed lever arm 43 having a forked end 44 engaging a pin 46 on a guide part 44 which is slidably mounted in the clockwork casing 41 and carries at one end a roller 47. When door 3 is unlocked, lever 38 is turned and effects turning movement of lever arm 43 so that guide member 45 is displaced, and carrier 9 with a diagram sheet is moved away from the points of the recording means, not shown in FIGS. 6 and 7. During the opening and closing of the door, roller 47 moves along the circular path shown in FIG. 7 in dash-and-dot lines. FIG. 7 shows that carrier 9 surrounds the rotating top wall of the clockwork 41 by which the diagram sheet is rotated to produce circumferntial recordings by the radially moving recording means 10, 12 and 14.

A tachograph according to the invention can be mounted in a flat housing which also envelops a speedometer, an odometer, and supports a clock on its front wall. Consequently, the unit can be easily built into the dashboard of a passenger car or truck as shown in FIG. 1a, with front wall 3 located on the dashboard, and housing 1 perpendicularly projecting into the space behind the dashboard. The operation required for an exchange of diagram sheets is extremely simple, requires no skill, and is similar to the operations in known tachographs where the lid of the instrument contains the clockwork and the diagram carrier. Consequently, truck drivers who are used to conventional tachographs do not have to be retrained for use of the tachograph according to the invention. An advantage of the present invention over conventional tachographs is that the apparatus of the invention does not require a coupling between the measuring part of the instrument and the indicator part, which in conventional constructions, is provided in the pivoted lid of the instrument.

It will be understood that each of the elements described above, or two or more together, may also find a useful application in other types of tachographs differing from the types described above.

While the invention has been illustrated and described as embodied in a tachograph in which the diagram sheet is located in a plane perpendicular to the front wall of the housing, and in which a movable housing part can be moved with the carrier and the diagram sheet to an outer position for exchange of diagram sheets differing from the types described above, it is not intended to be limited to the details shown, since various modifications and structural changes may be made without departing from the spirit of the present invention in any way.

What is claimed as new and desired to be protected by Letters Patent is set forth in the appended claims:

1. Tachograph for an automobile dashboard, comprising, in combination, housing means including a stationary housing part including a stationary front wall part secured to the dashboard substantially in the plane of the same, and a movable housing part including a front wall part, and being mounted on said stationary housing part for movement between a normal inner position in which said movable front wall part is located substantially in said plane of said dashboard and in which said movable housing part rearwardly projects into the space behind the dashboard, and an outer position in which said movable front wall part is located forwardly of said stationary front wall part; recording means mounted in said stationary housing part and adapted to be driven by a movable part of the automobile so as to move in a recording plane intersecting the plane of the dashboard; carrier means mounted on said movable housing part and including a rotary part having a planar supporting surface located in said recording plane, said supporting surface being adapted to support a flat diagram sheet in said recording plane engaged by said recording means in said inner position of said movable housing part, and being located in said outer position at least partly outside of said stationary housing part and forwardly of the dashboard so as to be accessible for exchange of the diagram sheet; means mounting said carrier means for movement between a recording position adjacent said recording means, and an inoperative position; and control means for moving said carrier means between said inoperative and recording positions.

2. Tachograph as claimed in claim 1 including a speedometer mounted on said stationary housing part and including a dial located behind said stationary front wall part; and wherein said stationary front wall part is at least partly transparent and is located in front of said dial.

3. Tachograph as claimed in claim 1 wherein said stationary housing part has a compartment for storing blank diagram sheets; and including another movable front wall part mounted on said stationary housing part for opening and closing said compartment.

4. Tachograph as claimed in claim 1 wherein said stationary housing part includes a transparent movable cover for covering said carrier means and recording means.

5. Tachograph as claimed in claim 1 wherein said supporting surface of said rotary part of said carrier means and said recording plane are perpendicular to said front walls and to said plane of said dashboard.

6. Tachograph as claimed in claim 1 wherein said movable housing part is a drawer mounted in said stationary housing part for straight movement with said movable front wall part, said carrier means and said diagram sheet between said inner position and said outer position.

7. Tachograph for an automobile dashboard, comprising housing means having front wall means and being mounted behind said dashboard with said front wall means substantially coextensive with the plane of said dashboard, said housing means including a stationary housing part, and a movable housing part mounted for movement between an inner position and an outer position located at least partly forwardly of said dashboard; recording means mounted on said stationary housing part and adapted to be driven by a movable part of the automobile; carrier means mounted on said movable housing part and having a supporting surface located in said inner position of said movable housing part in a plane intersecting said plane of said dashboard, said surface being adapted for supporting a diagram sheet engaged in said inner position by said recording means, and being located in said outer position outside of said stationary housing part and forwardly of said dashboard so as to be accessible for exchange of said diagram sheet; means mounting said carrier means on said movable housing part for movement between a recording position in which said supporting surface is located close to said recording means so that a diagram sheet thereon is engaged by the same, and an inoperative position in which a diagram sheet on said supporting surface is spaced from said recording means; and control guide means operatively connecting said carrier means with said stationary housing part so that during movement of said movable housing part with said carrier means between said inner and outer position, said carrier means is moved between said recording position and said inoperative positions.

8. Tachograph as defined in claim 7 wherein said control guide means includes means for holding said carrier means in said recording position while said movable housing part is in said inner position, and for moving said carrier means to said inoperative position shortly after the start of the movement of said movable housing part toward said inoperative position so the said recording means make a short recording in the direction of movement of said movable housing part for indicating the operation of said movable housing part.

9. Tachograph as defined in claim 7, wherein said control guide means include cam means on said stationary housing part, and cam follower means on said carrier, said cam means being shaped so that said carrier means is moved by said cam follower means to said recording position shortly before said movable housing part arrives in said inner position.

10. Tachograph as defined in claim 9 wherein said cam means has a cam slot; and wherein said carrier means is mounted on said movable housing part for turning movement between said recording and inoperative positions, and wherein said cam follower means has a projecting pin guided in said cam slot.

11. Tachograph as defined in claim 7 wherein said control guide means include roller means rolling on said stationary housing part during movement of said movable housing part, expansible mounting means mounting said roller means on said carrier means, and control means connected with said mounting means and engaging said stationary housing part in said inner position of said movable housing part for expanding said mounting means in said inner position so that said carrier means and said supporting surface are placed in said recording position.

12. Tachograph as defined in claim 11 wherein said mounting means include toggle lever means, and wherein said control means is a rod connected with said toggle lever means and displacing the same when being shifted upon engagement with said stationary housing part; and including spring means urging said toggle lever means to a contracted position in which said carrier means is in said inoperative position.

13. Tachograph for an automobile dashboard, comprising housing means having front wall means and being mounted behind said dashboard with said front wall means substantially coextensive with the plane of said dashboard, said housing means including a stationary housing part, and a movable housing part mounted for movement between an inner position and an outer position located at least partly forwardly of said dashboard; recording means mounted on said stationary housing part and adapted to be driven by a movable part of the automobile; and carrier means mounted on said movable housing part and having a rotary carrier part with a supporting surface located in said inner position of said movable housing part in a plane intersecting said plane of said dashboard, said surface being adapted for supporting a diagram sheet engaged in said inner position by said recording means, and being located in said outer position outside of said stationary housing part and forwardly of said dashboard so as to be accessible for exchange of said diagram sheet, said carrier means including a casing and a clockwork in said casing for driving said rotary carrier part, said carrier means forming a compartment for diagram sheets and having a slot for insertion of the same, said casing being circular and having a diameter at least equal to the diameter of a diagram sheet.

14. Tachograph for an automobile dashboard, comprising housing means having front wall means and being mounted behind said dashboard with said front wall means substantially coextensive with the plane of said dashboard, said housing means including a stationary housing part, and a movable housing part mounted for movement between an inner position and an outer position located at least partly forwardly of said dashboard; recording means mounted on said stationary housing part and adapted to be driven by a movable part of the automobile; carrier means mounted on said movable housing part and having a supporting surface located in said inner position of said movable housing part in a plane intersecting said plane of said dashboard, said surface being adapted for supporting a diagram sheet engaged in said inner position by said recording means, and being located in said outer position outside of said stationary housing part and forwardly of said dashboard so as to be accessible for exchange of said diagram sheet; means for mounting said carrier means on said movable housing part for movement between a recording position in which a diagram sheet on said supporting surface engages said recording means, and an inoperative position; a turnable lock on said movable housing part for locking the same in said inner position to said stationary housing part; and linkage means connecting said lock with said carrier means so that when said lock is operated, said carrier means is moved between said recording position and said inoperative position.

15. Tachograph for an automobile dashboard, comprising, in combination, housing means including a stationary housing part including a stationary front wall part secured to the dashboard substantially in the plane of the same, and a movable housing part including a hinged flat door plate mounted on said stationary housing part for angular movement between a normal inner closing position in which said door plate is located substantially in said plane of said dashboard closing said housing means and in which said movable housing part rearwardly projects into the space behind the dashboard, and an outer open position in which said door plate is located forwardly of said stationary front wall part; recording means mounted in said stationary housing part and adapted to be driven by a movable part of the automobile so as to move in a recording plane intersecting the plane of the dashboard; and carrier means connected with said door plate and including a rotary part having a planar supporting surface located in said recording plane, said supporting surface being adapted to support a flat diagram sheet in said recording plane engaged by said recording means in said inner closing position of said door plate, and being located in said outer open position at least partly outside of said stationary housing part and forwardly of the dashboard so that said carrier means is located outside said housing accessible for exchange of the diagram sheet.

References Cited

UNITED STATES PATENTS

| | | | |
|---|---|---|---|
| 2,341,118 | 2/1944 | Rodanet | 346—18 |
| 2,902,332 | 9/1959 | Bauer | 346—145 X |
| 3,281,854 | 10/1966 | Fiehn | 346—18 |
| 2,475,744 | 7/1944 | Harman | 274—2 X |

RICHARD B. WILKINSON, *Primary Examiner.*

JOSEPH W. HARTARY, *Assistant Examiner.*

U.S. Cl. X.R.

346—137, 145